Dec. 19, 1939.  W. SALISBURY  2,183,944
PROCESS OF PRODUCING POTTERY
Filed Dec. 7, 1936
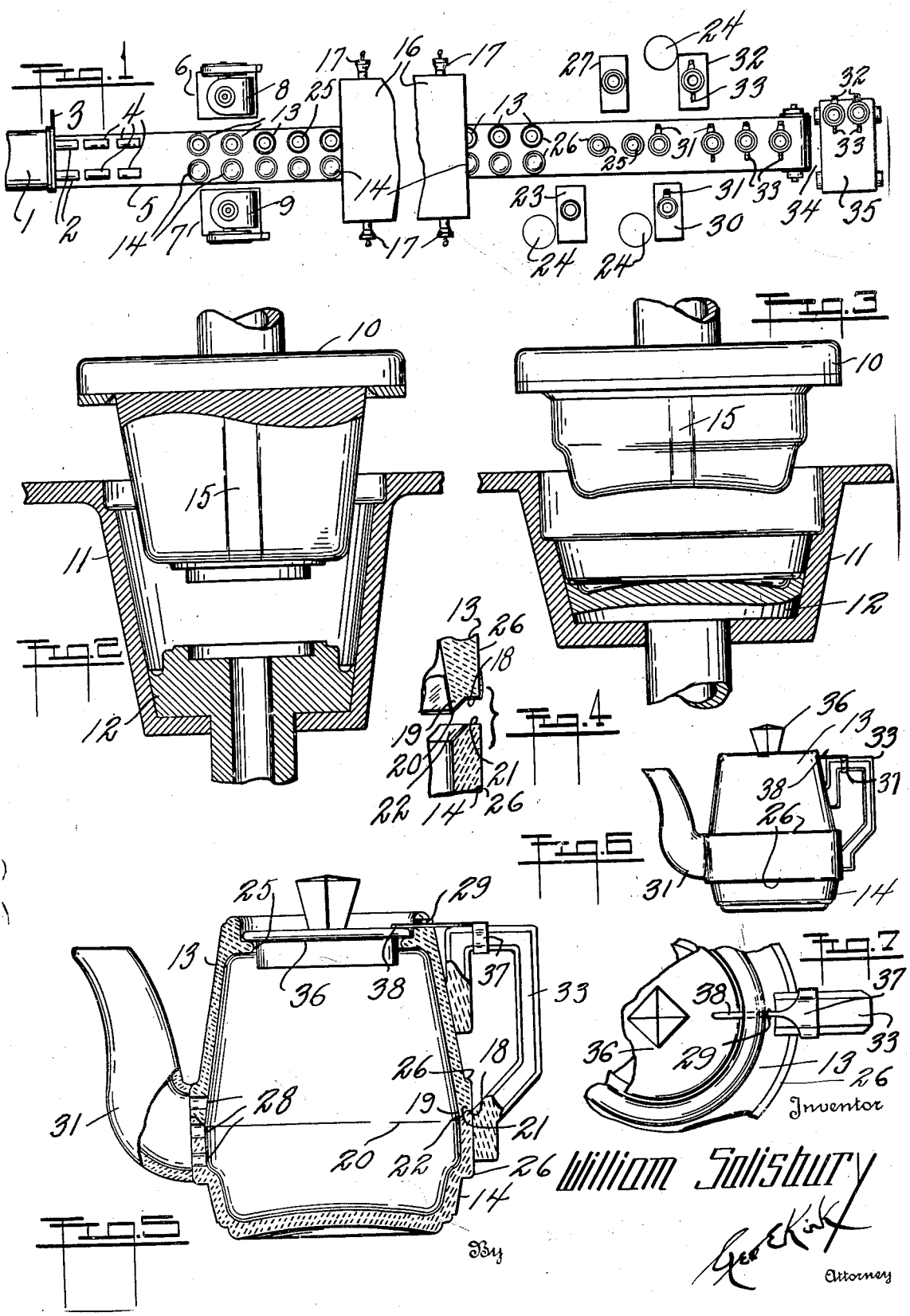

Patented Dec. 19, 1939

2,183,944

UNITED STATES PATENT OFFICE 2,183,944

PROCESS OF PRODUCING POTTERY

William Salisbury, Monroeville, Ohio

Application December 7, 1936, Serial No. 114,572

3 Claims. (Cl. 25—156)

This invention relates to a process of producing pottery.

This invention has utility when incorporated in the production of ceramics, more particularly articles formed from a multiple of pre-formed sections.

Referring to the drawing:

Fig. 1 is a diagrammatic showing of a continuous production line embodying the invention herein for forming hollow ceramic articles;

Fig. 2 is a section partially through a pair of metal dies for forming a ceramic section to be later incorporated in a finished article;

Fig. 3 is a section partially through a pair of dies for forming another section of the article;

Fig. 4 is a distributed fragmentary view showing the interfitting seats of a pair of pre-formed sections prior to assembly one with the other;

Fig. 5 is a section through a finished hollow ceramic article, herein shown as a teapot;

Fig. 6 is a side elevation of the article of Fig. 5; and

Fig. 7 is a fragmentary plan view of the article of Fig. 5.

In the production of ware hereunder, pug mill 1 simultaneously extrudes a plurality of streams of base material 2, which may be clay found in the natural state or treated to bring such to a "semi-plastic state", recognized in the art as a consistency too heavy for suitable manual forming. Cutting mechanism 3 slices the streams into gobs 4 to be deposited in sets upon continuously moving conveyor 5. The gobs 4 are of the same size and in that the plurality of streams 2 are simultaneously extruded from a common batch, the gobs 4 are of nearly identical consistency, weight, and specific gravity.

As the gobs 4 approach forming stations 6, 7, operators of presses 8, 9, approximately simultaneously remove a pair of the gobs and place one into each of the machines, where they are formed into ceramic sectional pieces later to be assembled into a finished article. The machine 8 is provided with spinner 10, female die or mold element 11, and knock-out bottom 12. A descent and ascent of the spinner 10 into and out of the female die 11 following charging is subsequently followed by a shifting of the knock-out bottom 12 lifting a finished section 13 which may be placed onto the conveyor 5 to continue to other stations for further treatment.

The machine 9 has had the spinner 10, female die 11, cooperate with the knock-out bottom 12 to form an additional section 14, which likewise is placed upon the conveyor 5 adjacent the section 13. The spinners or plungers 10, molds or dies 11, and knock-out bottoms 12, are all of steel or other suitable metal, wherein there is no absorption of moisture from the clay parts as formed thereon and which may be operated speedily for continuous production. Flattened faces 15 on the spinners 10 serve to provide a polish on the clay parts and also facilitate withdrawal of the spinners from the molded or stamped piece. The polish is the apparent result of forcing the fines in the gob toward and onto the surfaces of formed sections with an even distribution thereof caused by the wiping action of the spinning metallic dies.

The sections 13, 14, are then carried in pairs by the conveyor into chamber 16, which may be heated by burners 17 to a predetermined temperature. Herein the sections 13, 14, are dried and otherwise conditioned to transfer them from their semi-plastic state to a "green" or "form-hard" state, which allows a ready manual handling without further shaping or distorting the parts. By maintaining the sections 13, 14, in pairs, approximately simultaneously pugged, formed and conditioned, and of similar mass, they emerge from this conditioning chamber with a nearly identical consistency throughout the mass thereof. For example, there is shown herein a hollow ceramic article in the form of a teapot, the section 13 forming the upper portion thereof, and the section 14, the base.

The section 13 has a seat 18 about the lower periphery thereof merging into triangular cross-sectional extension 19, terminating in inner edge 20. The section 14 is provided with an exterior peripheral seat 21 of an extent equivalent to the seat 18, merging into an interior seat 22, with equivalent extent and angularity as the seat 19. When the seats are brought together, there is a nicety of interfitting relationship. This operation may be performed at station 23, the operator first dipping one or both of the seat portions into slip 24, a suspension of clay in liquid or other cohesion-promoting material. The parts are then pressed together and by inserting the hand through the opening 25 of the part 13, the edge 20 can be firmly pressed toward the face or seat 22 manually or by a tool. There is a welding or cementing of these parts together and the accurately interfitting seats formed by the metal dies are brought in full face contact with each other completely about the periphery of the parts. Excess slip may be wiped away. The wiping of the excess slip from the joint at the station 23 fills in any possible pits or rough edges of the joint, giving it a smooth outer surface, so that even after firing the joint is invisible. It has been noted that breakage of a finished article is rarely along the joint, the weld being usually stronger than the body of the article.

From the seats of each member extends a thickened portion 26, which may be of greater extent in one section than the other so that there is a balancing or matching of the mass content of each section adjacent the seats. This insures an approximately identical cure adjacent the seats or joint in each piece so that the consistency of the base material is the same at each side of the joint for a substantial distance therefrom.

The assembly of the two sections being complete, the operator at station 23 may then replace the partially-completed article on the conveyor 5 or in some products the article may be complete by but two pieces.

The article then passes to station 27 and an operator thereat may, by the use of a suitable tool, pierce openings 28 therethrough, and in some instances if there is to be further operation or decoration, may also pierce opening 29 through the upper portion thereof. The ware is again replaced upon the conveyor and travels to station 30, whereat an operator may with the aid of slip place an additional part upon the article, herein shown as spout 31, in cooperative relationship with the openings 28. The article is then replaced upon the conveyor and travels to station 32, whereat it may receive handle 33, treated with slip.

It is replaced upon the conveyor and travels to station 34, where it may be removed and placed upon trucks 35 for transfer for further conditioning and thence to kilns for firing. The trucks 35 may be moved directly to a conditioning room or to a place for glazing prior to the firing.

In the instance the article is a teapot, it may be later supplied with a cover 36, and a clip 37 may be slidably attached to the upper portion of the handle 33, which clip may have extension 33 through the opening 29, and when in use have such extension over the cover to maintain it in place. By grasping the handle 33, the thumb of the holder is easily brought into contact with the clip 37 which may readily be moved into and out of cover-holding position.

By the use of non-porous dies approximately simultaneously shaping the major sections, as well as a common conditioning thereof, there is maintained an equivalent homogeneity and moisture content in each section, so that at the joinder there has been produced like base material in each piece especially at the seats, so that there can be a ready cementing together. This process also permits the use of a continuous moving conveyor for mass production of hollow ceramic ware.

What is claimed and it is desired to secure by United States Letters Patent is:

1. In a process for producing pottery, comprising pugging clay to a degree of stiffness beyond that suitable normally for jiggering thereof, simultaneously forming a portion of the pugged clay into a pair of gobs of approximate equal mass, shaping said gobs in separate molds into complemental elements of a container with rim portions on the said elements, drying said elements equally to a stage where they are mutually non-adhesive, coating the rim portion with a slip, abutting said coated rim portions for effecting assembly into a container, and firing the assembly thereby uniting the complemental elements to form a container.

2. In a process for producing pottery, comprising pugging clay to a degree of stiffness beyond that suitable normally for jiggering thereof, simultaneously forming a portion of the pugged clay into a pair of gobs of approximate equal mass, shaping said gobs in separate molds into complemental elements of a container, and in said shaping forming interfitting rim portions on the said elements, drying said elements equally to a stage where they are mutually non-adhesive, coating the rim portion with a slip, abutting said coated rim portions for effecting registering assembly therebetween into a container, and firing the assembly thereby uniting the complemental elements to form a container.

3. In a process for producing pottery, comprising pugging clay to a degree of stiffness beyond that suitable normally for jiggering thereof, simultaneously forming a portion of the pugged clay into a pair of gobs of approximate equal mass, placing said gobs in separate molds, pressing said gobs in said molds by means of separate plungers, and during said pressing operation rotating said plungers relative to said gobs and molds, said molds and plunger being shaped to form said gobs into complemental elements of a container with rim portions on the said elements, drying said elements equally to a stage where they are mutually non-adhesive, coating the rim portion with a slip, abutting said coated rim portions for effecting assembly into a container, and firing the assembly thereby uniting the complemental elements to form a container.

WILLIAM SALISBURY.